Sept. 16, 1958     J. J. PARKER ET AL     2,852,262
TWIST TYPE CHUCK
Filed June 22, 1956                      2 Sheets-Sheet 1
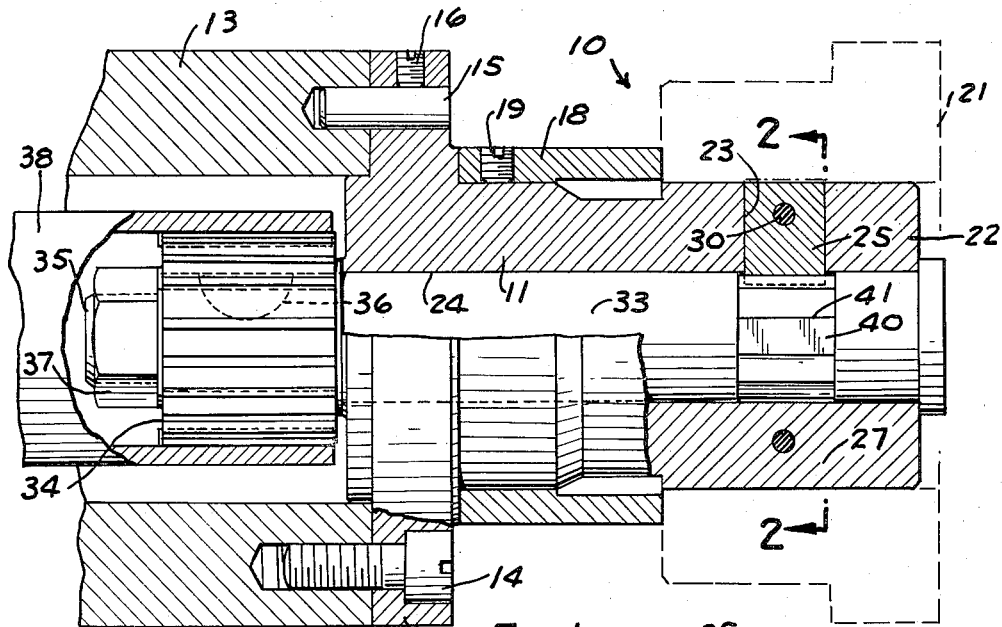
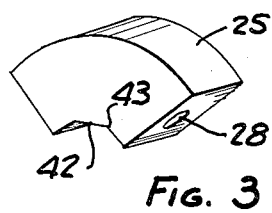
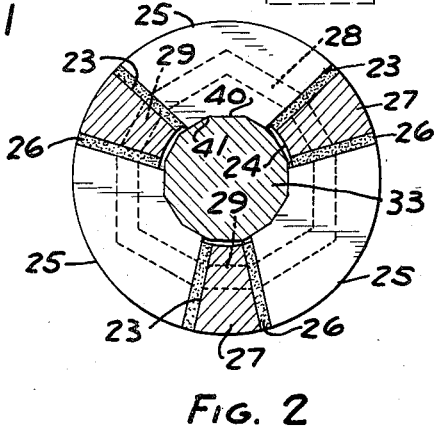
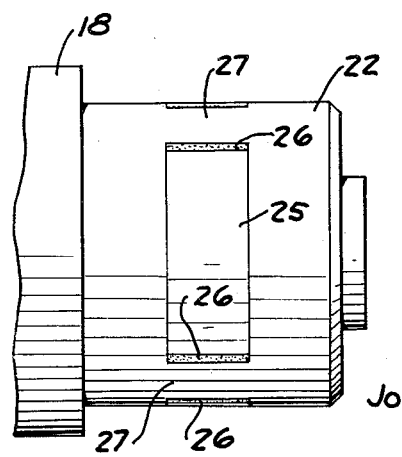
INVENTORS
JOHN J. PARKER & LONDON T. MORAWSKI
BY
*Barnes, Kisselle, Laughlin & Raisch*
ATTORNEYS Sept. 16, 1958  J. J. PARKER ET AL  2,852,262
TWIST TYPE CHUCK
Filed June 22, 1956  2 Sheets-Sheet 2
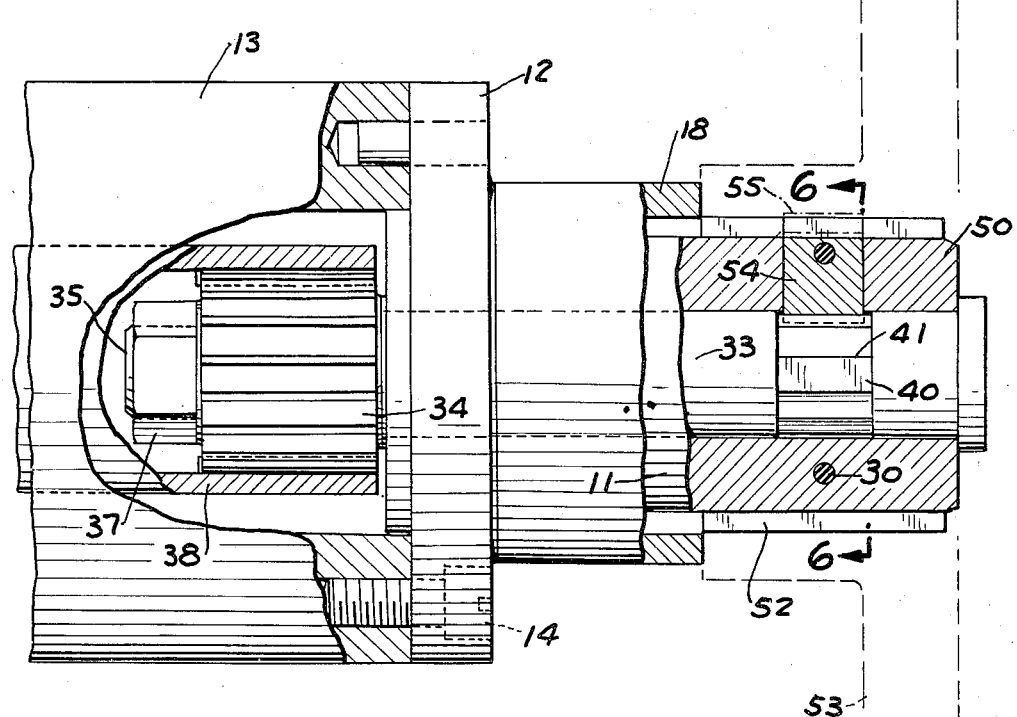
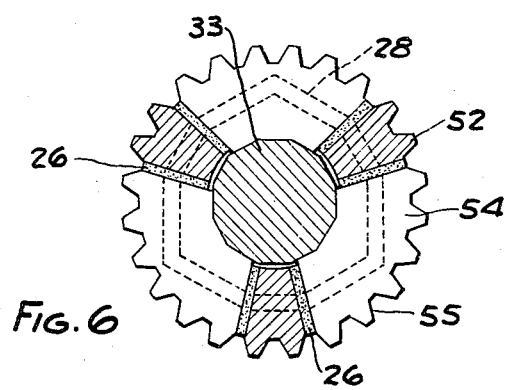
INVENTORS
JOHN J. PARKER & LONDON T. MORAWSKI
BY
Barnes Kisselle Laughlin & Reisch
ATTORNEYS.

2,852,262

TWIST TYPE CHUCK

John J. Parker and London T. Morawski, Detroit, Mich.

Application June 22, 1956, Serial No. 593,110

8 Claims. (Cl. 279—1)

This invention relates to a chuck for holding work pieces and the like.

The invention can be used for holding various types of work pieces on stationary mounts and on moving mounts such as rotating spindles.

An object of the invention is to provide a simple, inexpensive, improved chuck structure which can be quickly and easily operated for engaging and releasing a work piece.

The invention generally contemplates a chuck body with circumferentially arranged work piece engaging elements radially shiftably secured thereto by means of a non-metallic resiliently distortable material. Operating means are provided for shifting the elements to hold a work piece, and the resilient material returns the elements for releasing the work piece when the operating means is inactuated. One form of the invention is shown in the accompanying drawings:

Fig. 1 is a partly sectional view illustrating a chuck according to this invention mounted on a spindle.

Fig. 2 is a sectional view on line 2—2 of Fig. 1.

Fig. 3 is a perspective view of a work piece engaging element separate from the other structure.

Fig. 4 is an elevational view of the work piece engaging portions of the chuck.

Fig. 5 is a partly sectional view of a modified form of the invention.

Fig. 6 is a sectional view on line 6—6 of Fig. 5.

A chuck 10 shown in Fig. 1 has a body 11 with a radial flange 12 adapted to be secured on a portion of a machine tool such as a spindle 13 by cap screws 14. Flange 12 is provided with a locating dowel 15 fixed in place by by a set screw 16. A work piece locating sleeve 18 is fixed on body 11 by a set screw 19.

Body 11 has a cylindrical extension 22 which is shown as having a smooth periphery for receiving and supporting a smooth surface of a work piece such as that shown in phantom at 21. Extension 22 has a plurality of circumferentially arranged openings 23 which taper in a radially inward direction and which communicate into an internal bore 24. A segmental work piece engaging element 25 is disposed in each opening 23. Each element 25 has a smaller circumferential dimension than its opening 23 and is positioned so that there is a space between the sides of the element and the adjacent walls of the chuck body.

These interspaces contain veins 26 of a resiliently distortable non-metallic material such as a natural or synthetic rubber or a plastic. The material is bonded to the walls of opening 23 and the sides of segments 25 to secure the segments on the body. The segments can be shifted radially relatively to body extension 22 by stressing the resilient material. The segments and intervening portions 27 of the body are provided with aligned generally circumferentially extending openings 28 and 29 respectively, and these openings are filled with an annulus 30 of the resilient material. Annulus 30 and veins 26 of the resilient material may be integrally formed.

A shaft 33 extends rockably through central bore 24 of the body and has a pinion 34 fixed on one outwardly projecting end 35 as by a key 36 and a nut 37 for engagement by a toothed actuator 38. A portion of shaft 33 axially aligned with openings 23 is formed as a cam for interengagement with the radially inner ends of elements 25. For this purpose the shaft is shown as having polygonal form with alternate flats 40 and corners 41 which engage corresponding flats 42 and corners 43 on the segment interiors.

In use it may be assumed that chuck 10 has been mounted on spindle 13 and actuator 38 has been engaged with pinion 34 as described. Shaft 33 is rotatively positioned so that its flats and corners mate with the flats and corners on elements 25. The annulus 30 and veins 26 of resilient material secure elements 25 on body extension 22. The radially outer portions of the elements and body extension 22 are generally flush and provide a support for receiving and supporting work piece 23.

When the work piece is positioned on the support, shaft 33 is turned or rocked by actuator 38 relatively to body 11 so that corner portions 41 of the shaft engage against flats 42 on elements 25. This cams the elements radially outwardly into tight engagement with the work piece interior thereby fixing the work piece on the chuck. The resilient veins 26 are stressed in a shear direction.

Spindle 12 and actuator 38 may then be rotated together for rotating work piece 23 to facilitate machining or other operations thereon. To remove work piece 23 from the chuck, shaft 33 is rocked relatively to body 11 by actuator 38 to bring shaft flats and corners into mating engagement with the flats and corners on elements 25. The stressed veins draw the elements inwardly out of engagement with work piece 23 so that the work piece may be removed from the chuck. The cycle may then be repeated with another work piece.

The resilient material of veins 26 and annulus 30 holds elements 25 in radially inwardly or retracted position regardless of the rotative position of the chuck when the chuck is stationary and when the chuck is rotating at relatively low speeds.

The form of the invention shown in Figs. 5 and 6 is similar to the principal form except that cylindrical extension 50 of chuck body 11 is provided with teeth 52 for dental engagement with a toothed work piece 53, and segments 54 are provided with similar teeth 55. Use and operation of this form of the invention is similar to use and operation of the principal form.

We claim:

1. A chuck for holding work pieces comprising, a body adapted to be mounted on a support such as a machine tool, a plurality of work piece engaging elements, said elements being generally radially shiftably secured on said body by yieldable means including a resiliently distortable, non-metallic material such as natural or synthetic rubber or plastic, said body and said elements cooperating to form a support for receiving and supporting a work piece, and operating means operable to shift said elements generally radially of said body against the resistance of said yieldable means for engaging and holding a work piece, said yieldable means being operative resiliently to return said elements generally radially for releasing a work piece responsively to release of said elements by said operating means.

2. The chuck defined in claim 1 wherein said body and said elements have generally smooth peripheral portions for engaging a work piece.

3. The chuck defined in claim 1 wherein said body and said elements are toothed for dental engagement with a toothed work piece.

4. A chuck for holding work pieces comprising, a body adapted to be mounted on a support such as a machine tool, rockable shaft means on said body, said body having a plurality of circumferentially arranged radial openings, a plurality of work piece engaging elements in said openings, said elements being generally radially shiftably secured in said openings by a resiliently distortable non-metallic material such as natural or synthetic rubber or plastic, the radially outer portions of said elements and said body cooperating to form a support for receiving and supporting a work piece, the radially inner end portions of said elements engaging said shaft means, cam means on said shaft means selectively operable responsively to turning movement of said shaft means to shift said elements generally radially outwardly for engaging and holding a work piece and to release said elements, said material being resiliently operative to shift said elements generally radially inwardly for releasing a work piece responsively to release of said elements by said cam means.

5. A chuck for holding work pieces comprising, a body adapted to be mounted on a support such as a machine tool, rockable shaft means on said body, said body having a plurality of circumferentially arranged radial openings, said openings being tapered in a radial direction, a plurality of tapered work piece engaging elements in said openings, said elements being circumferentially smaller than said openings, a vein of resiliently distortable material bonded to the sides of said elements and the sides of said openings, the radially outer portions of said elements and said body cooperating to form a support for receiving and supporting a work piece, the radially inner end portions of said elements engaging said shaft means, cam means on said shaft means selectively operable responsively to turning movement of said shaft to shift said elements generally radially outwardly for engaging and holding a work piece and to release said elements, said veins being resiliently operative to shift said elements generally radially inwardly for releasing a work piece responsively to release of said elements by said cam means.

6. A chuck for holding work pieces comprising, a body adapted to be mounted on a support such as a machine tool, said body having an internal bore, rockable shaft means in said bore, said body having a plurality of circumferentially arranged radial openings opening into said bore and at the exterior of the body, said openings being tapered in a radial direction, a plurality of tapered work piece engaging elements in said openings, said elements and said body having aligned, generally circumferentially extending openings, an annulus of a resiliently distortable, non-metallic material such as natural or synthetic rubber or plastic passing through said aligned openings for securing said elements generally radially shiftably on said body, the radially outer portions of said elements and said body cooperating to form a support for receiving and supporting a work piece, the radially inner end portions of said elements engaging said shaft means, cam means on said shaft means selectively operable responsively to turning movement of said shaft means to shift said elements generally radially outwardly for engaging and holding a work piece and to release said elements, said annulus being resiliently operative to shift said elements generally radially inwardly for releasing a work piece responsively to release of said elements by said cam means.

7. A chuck for holding work pieces comprising, a body adapted to be mounted on a support such as a machine tool, said body being adapted to receive and support a work piece, work piece engaging means shiftably secured on said body by a resiliently distortable, non-metallic material, so that said work piece engaging means can be shifted relatively to said body for engaging and releasing a work piece, and operating means including cam elements engageable with said work piece engaging means and selectively operable to shift said work piece engaging means and release the same, said material being operative to return said work piece engaging means when the latter is released by said operating means, whereby to secure and release a work piece on said chuck.

8. A chuck for holding work pieces comprising, a body adapted to receive and support a work piece, work piece engaging means, said body and work piece engaging means having opposed, spaced apart portions, a vein of resiliently yieldable material disposed in the space between said spaced apart portions and bonded to said portions of said body and work piece engaging means, so that said work piece engaging means can be shifted relatively to said body for engaging and releasing a work piece, operating means operable to shift said work piece engaging means and release the same, said vein being operative to return said work piece engaging means when the latter is released by said operating means.

References Cited in the file of this patent

UNITED STATES PATENTS

| | | |
|---|---|---|
| 2,681,805 | Parker et al. | June 22, 1954 |
| 2,765,175 | Parker et al. | Oct. 2, 1956 |
| 2,803,159 | Hohwart et al. | Aug. 20, 1957 |
| 2,805,864 | Parker et al. | Sept. 10, 1957 |